US012715799B2

(12) United States Patent
Petitpain Perrin et al.

(10) Patent No.: US 12,715,799 B2
(45) Date of Patent: Aug. 25, 2026

(54) METHOD FOR TREATING A WASTEWATER EFFLUENT IN A SEQUENCING BATCH REACTOR (SBR) HAVING A CONSTANT LEVEL AND CONTROLLED RECOVERY

(71) Applicant: SUEZ INTERNATIONAL, Paris la Defense Cedex (FR)

(72) Inventors: Françoise Petitpain Perrin, Paris (FR); Alexis Daunay, Paris (FR)

(73) Assignee: SUEZ INTERNATIONAL, Paris la Défense (FR)

( * ) Notice: Subject to any disclaimer, the term of this patent is extended or adjusted under 35 U.S.C. 154(b) by 638 days.

(21) Appl. No.: 18/029,070

(22) PCT Filed: Oct. 1, 2021

(86) PCT No.: PCT/EP2021/077179
§ 371 (c)(1),
(2) Date: Mar. 28, 2023

(87) PCT Pub. No.: WO2022/069745
PCT Pub. Date: Apr. 7, 2022

(65) Prior Publication Data

US 2023/0365448 A1 Nov. 16, 2023

(30) Foreign Application Priority Data

Oct. 2, 2020 (FR) ........................................ 2010111

(51) Int. Cl.
*B01D 21/00* (2006.01)
*B01D 21/24* (2006.01)
(Continued)

(52) U.S. Cl.
CPC ........ *C02F 3/1263* (2013.01); *B01D 21/0048* (2013.01); *B01D 21/2444* (2013.01);
(Continued)

(58) Field of Classification Search
CPC .... B01D 21/2444; B01D 21/34; C02F 3/1263
See application file for complete search history.

(56) References Cited

U.S. PATENT DOCUMENTS 4,596,658 A 6/1986 Mandt
4,883,602 A 11/1989 Anderson
(Continued)

FOREIGN PATENT DOCUMENTS

CN 108473350 A 8/2018
EP 1 731 487 A1 12/2006
(Continued)

OTHER PUBLICATIONS

Russian Office Action issued in Russian Patent Application No. 2023110903 dated Jan. 20, 2025, with English translation.
(Continued)

*Primary Examiner* — Bradley R Spies
(74) *Attorney, Agent, or Firm* — BakerHostetler

(57) ABSTRACT

An installation for treating a wastewater effluent in a constant-level sequencing batch reactor (SBR), the SBR includes a chamber that is able to contain a mixture of wastewater and sludge comprising different levels, each level being defined by a concentration and/or a density of sludge, a sludge bed situated at the bottom of the chamber, a device for supplying the SBR with a volume of effluent to be treated close to the bottom of the chamber, in the sludge bed, preferably via a distribution network covering the bottom of the chamber, means for recovering a clarified fraction of the contents of the chamber, the SBR being able to implement a treatment method comprising a biological treatment reaction sequence comprising at least a step of aerating the contents of the chamber, during which the level of the surface of the mixture rises, a decanting step, during which sludge is deposited on the bottom of the chamber and the contents of the chamber are clarified close to the surface thereof, a step of recovering the clarified fraction of the contents of the chamber, the recovery step and supply step taking place simultaneously, so as to keep the level of the
(Continued)

contents of the chamber substantially constant during the recovery step and supply step, the installation also comprising control means and recovery means.

12 Claims, 7 Drawing Sheets

(51) Int. Cl.
*B01D 21/34* (2006.01)
*C02F 3/12* (2023.01)

(52) U.S. Cl.
CPC ........ *B01D 21/34* (2013.01); *C02F 2201/005* (2013.01); *C02F 2203/006* (2013.01)

(56) References Cited

U.S. PATENT DOCUMENTS 6,884,354 B1 4/2005 Calltharp
2003/0057152 A1 3/2003 Haridas
2007/0176890 A1 8/2007 Czepek et al.
2018/0043286 A1 2/2018 Wett

FOREIGN PATENT DOCUMENTS

| | | | |
|---|---|---|---|
| JP | S62-149399 | A | 7/1987 |
| JP | 2018-516166 | A | 6/2018 |
| RU | 2006 133 533 | A | 3/2008 |
| RU | 106 615 | U1 | 7/2011 |
| WO | 2004/024638 | A1 | 3/2004 |
| WO | 2016/020805 | A1 | 2/2016 |

OTHER PUBLICATIONS

Russian Search Report issued in Russian Patent Application No. 2023110903 dated Jan. 20, 2025, with English translation.
Notice of Reasons of Rejection issued in Japanese Patent Application No. 2023-520116 dated Jan. 30, 2025, with English translation.
First Office Action issued in Chinese Patent Application No. 202180074863.1 dated Jun. 27, 2025, with English translation.

METHOD FOR TREATING A WASTEWATER EFFLUENT IN A SEQUENCING BATCH REACTOR (SBR) HAVING A CONSTANT LEVEL AND CONTROLLED RECOVERY

CROSS-REFERENCE TO RELATED APPLICATIONS

This application is a National Stage of International patent application PCT/EP2021/077179, filed on Oct. 1, 2021, which claims priority to foreign French patent application No. FR 2010111, filed on Oct. 2, 2020, the disclosures of which are incorporated by reference in their entirety.

FIELD OF THE INVENTION

The invention lies in the technical field of the biological treatment of municipal and industrial wastewater, and more specifically what is referred to as the Sequencing Batch Reactor (or SBR) technology.

BACKGROUND

An SBR operates in a sequenced manner with different treatment steps, and in particular a decanting phase which makes it possible to separate what is referred to as "activated" sludge from the treated water.

A method referred to as an "activated sludge" method uses biological purification in its treatment of wastewater. This is a purification method using free cultures. The principle is that of degrading the organic matter, in suspension or dissolved in the wastewater, using bacteria. A good level of biodegradation is achieved by virtue of homogenization of the medium allowing the bacteria to access the particles and good aeration. Next, the sludge is deposited at the bottom of the reactor during the decanting phase.

An activated sludge method may aim to eliminate carbon-based pollution and nitrogen-based pollution, and to eliminate or recover the phosphorus contained in the phosphorus-based pollution.

Regardless of the treatment technology employed, the SBR technology is limited in its dimensioning by the decantability of the sludge. Specifically, one of the factors limiting the concentration of activated sludge in an SBR, itself representing a possibility for treating a polluting load, is the decantability of the sludge, generally expressed by the Mohlman index. The Mohlman index is the index of the ability of the sludge to be decanted. This index defines the volume of activated sludge decanted in a half-hour with respect to the mass of dry residue (or the concentration of suspended matter, also referred to as SM) of this sludge: the lower the index, the better the capability of the sludge to be decanted.

The denser the sludge, the quicker the decanting phase and the shorter the overall duration of the treatment cycle, this making it possible to treat more pollution in a single day by carrying out a higher number of cycles.

Denser sludge makes it possible to work with higher concentrations while allowing good decantability (index) and therefore making it possible to treat more pollution in a single construction volume.

A first design of what is referred to as a sequencing reactor (SBR) employs two different volumes which are used alternately for reaction and decanting, the water being transferred from the reaction compartment to the decanting compartment (Seghers Unitank method). However, this type of SBR has been improved, and the majority of biological reactors of the sequencing type (SBR) are currently designed with a single volume in which the different steps of the treatment take place in succession. These reactors are generally variable-level reactors: the phase of supplying raw water and the phase of recovering treated water are separated in time, and so, during the recovery of the treated water, the level of water in the reactor lowers.

Also known are SBRs referred to as constant-level SBRs, which make it possible to reduce the time of each treatment sequence, while maintaining the effectiveness of the treatment. Such a reactor is described for example in the document WO2016020805.

Operation of a constant-level SBR involves supplying raw water and recovering treated water simultaneously and at the same flow rate in order to maintain the constant level: if the equipment for recovering treated water is submerged without particular precautions being taken, it will be contaminated by SM (suspended matter) during the reaction phase (reaction sequence) and more specifically during the aeration phase, during which the entire volume of the biological reactor will be at a mean sludge concentration of several grams per liter.

The SBR method described in the application WO2004/024638 proceeds on the basis of operation with a pipe semi-submerged in the chamber of the SBR. This operation requires, during the cycle, a lowering of the liquid level to avoid sludge being entrained into the pipe during the reaction phase on account in particular of the rise in the level of water associated with gas retention.

This lowering of the level brings about a certain number of problems, which the proposed invention seeks to solve:

- an increase in the height of the reactor via a hydraulic volume required for the supply step,
- an increase in the cycle time to include the time for lowering the level and then the filling time,
- the need to recycle the volume corresponding to the lowering of the level at the start of treatment via intermediate storage and pumps,
- an increase in the instantaneous supply flow rate to incorporate the treatment of this recycle volume,
- the water situated in the volume corresponding to the lowering of the level is potentially rich in nitrates, which prove to be detrimental to the leaching of the phosphates during the supply recovery phase.

The document US 2018/0043286 describes a method for draining water from a reservoir based on a drainage pipe disposed entirely in the reservoir. The water from the reservoir enters the drainage pipe via permanently submerged orifices. Compressed air is introduced into the drainage pipe to evacuate the water from the pipe to a collector. The compressed air is evacuated from the drainage pipe in order to fill the pipe with water. In this solution, the drainage pipe comprises simple orifices through which the water and the sludge directly enter the pipe. More specifically, during the aeration phase, the expansion height of the volume of water in the chamber varies on account of the regulation of the quantity of air injected. This brings about a variation in the pressure in the pipe. The water and the sludge present in the chamber then accumulate inside the pipe. The sludge accumulates in the pipe during the aeration phase and is partially carried along with the treated water, to the detriment of the quality thereof and of compliance with waste standards. Therefore, this solution is not compatible with treatment of water comprising steps of aeration and decanting of sludge in the reservoir.

Also known is the U.S. Pat. No. 6,884,354, which describes a constant-level sequencing batch reactor (SBR), including a clarifier (or recovery device) as described in the U.S. Pat. No. 4,596,658, said clarifier being disposed horizontally in the vicinity of a wall of the reactor. The clarifier in U.S. Pat. No. 4,596,658 comprises a laminar opening in the form of an elongate slot for collecting the clarified water. Such a device is liable to create turbulence during the aspiration of the clarified water. This may harm the quality of the clarified water recovered.

The invention aims to remedy all or some of the problems set out above by proposing a method for treating a wastewater effluent in a constant-level sequencing batch reactor (SBR) in which the treated water is recovered by an air-blocked recovery duct. The invention is based on the step of controlling the recovery means of the chamber of the SBR, during which, just before the activation of the aeration in the SBR, the recovery duct is filled with air until the duct has been completely emptied of the water contained in the duct. The invention ensures the non-contamination of the recovery duct for treated water with activated sludge during the aeration by virtue of controlled filling of the recovery duct with air depending on the steps of the treatment method.

SUMMARY OF THE INVENTION

To this end, a subject of the invention is a method for treating a wastewater effluent in a sequencing batch reactor (SBR), said SBR comprising:

- a chamber that is able to contain a mixture of wastewater and sludge comprising different levels, each level being defined by a concentration and/or a density of sludge,
- a sludge bed situated at the bottom of the chamber, means for recovering a clarified fraction of the contents of the chamber, comprising:
  - a recovery duct extending below the surface of the mixture in the chamber, between the interior and the exterior of the chamber, comprising:
    - a plurality of channels hydraulically connecting the contents of the chamber and the recovery duct,
    - a plurality of recovery orifices via which the clarified fraction of the contents of the chamber is intended to be drained,
    - an air duct hydraulically or aeraulically connecting the recovery duct to the atmosphere,
  - an air exhaust valve on the air duct, which is able to take up an open position or a closed position,
  - an air/water blocking device on the recovery duct, which is able to block the air in the recovery duct upstream of the air/water blocking device and to block the water downstream of the blocking device,
  - an air injector connected to the recovery duct and intended to supply the recovery duct with boosted and/or compressed air, said method comprising:

- a step of supplying the SBR, during which a volume of effluent to be treated close to the bottom of the chamber is introduced, in the sludge bed, preferably via a distribution network covering the bottom of the chamber, a biological treatment reaction sequence comprising at least:
  - a step of aerating the contents of the chamber, during which the level of the surface of the mixture rises,
- a decanting step, during which sludge is deposited on the bottom of the chamber and the contents of the chamber are clarified close to the surface thereof, a step of recovering the clarified fraction of the contents of the chamber, said recovery step and supply step taking place simultaneously, so as to keep the level of the contents of the chamber substantially constant during the recovery step and supply step, said method being characterized in that it comprises:

- a step of controlling the recovery means, during which:
  - the recovery duct is filled with air until the recovery duct has been completely emptied of the clarified fraction contained in the recovery duct, and
  - the recovery duct is kept filled with air during the reaction sequence and preferably until the end of the decanting step,
- a step of expelling the air contained in the recovery duct with the clarified fraction just before the supply step and the recovery step,
- after the step of supplying the SBR, a step of filling the recovery duct with air by air injection, the exhaust valve being closed and the air/water blocking device being referred to as closed, during the aeration step,
- a step of keeping the recovery duct filled with air without air injection, the exhaust valve being closed and the air/water blocking device being referred to as closed, during the aeration step and decanting step.

Advantageously, during the step of filling the recovery duct with air, the exhaust valve is in the closed position, and the air/water blocking device blocks the air in the recovery duct by creating a hydraulic discontinuity between upstream and downstream of the air/water blocking device.

Advantageously, during the step of expelling the air from the recovery duct, the exhaust valve is in the open position so as to allow the evacuation of the air simultaneously with the ingress of clarified water into the recovery duct.

Advantageously, during the step of expelling the air from the recovery duct, after the evacuation of the air, the air/water blocking device takes up the position referred to as open so as to allow the clarified fraction to leave through the recovery orifices.

The invention also relates to an installation for treating a wastewater effluent in a sequencing batch reactor (SBR), said SBR comprising:

- a chamber that is able to contain a mixture of wastewater and sludge comprising different levels, each level being defined by a concentration and/or a density of sludge,
- a sludge bed situated at the bottom of the chamber,
- a device for supplying the SBR with a volume of effluent to be treated close to the bottom of the chamber, in the sludge bed, preferably via a distribution network covering the bottom of the chamber,
- means for recovering a clarified fraction of the contents of the chamber, comprising:
  - a recovery duct extending below the surface of the contents in the chamber, between the interior and the exterior of the chamber, comprising:
    - a plurality of channels hydraulically connecting the contents of the chamber and the recovery duct,
    - a plurality of recovery orifices via which the clarified fraction of the contents of the chamber is intended to be drained,
    - an air duct hydraulically or aeraulically connecting the recovery duct to the atmosphere,
  - an air exhaust valve on the air duct, which is able to take up an open position or a closed position,
  - an air/water blocking device on the recovery duct, each of the two valves being able to block the air in the recovery duct or to allow it to pass through,
  - an air injector connected to the recovery duct and intended to supply the recovery duct with boosted and/or compressed air, the SBR being able to implement a treatment method comprising a biological treatment reaction sequence comprising at least a step of aerating the contents of the chamber, during which the level of the surface of the mixture rises, a decanting step, during which sludge is deposited on the bottom of the chamber and the contents of the chamber are clarified close to the surface thereof, a step of recovering the clarified fraction of the contents of the chamber, said recovery step and supply step taking place simultaneously, so as to keep the level of the contents of the chamber substantially constant during the recovery step and supply step, the installation also comprising means for controlling the recovery means so as to fill the recovery duct with air until the recovery duct has been completely emptied of the clarified fraction contained in the recovery duct, to keep the recovery duct filled with air during the aeration step, and to expel the air contained in the recovery duct with the clarified fraction just before the supply step and the recovery step, to fill the recovery duct with air by air injection during the aeration step, to keep the recovery duct filled with air without air injection during the aeration step and decanting step.

In one embodiment, the blocking device comprises a U-shaped siphon between the air duct and the recovery orifices.

In another embodiment, the recovery orifices are positioned above the level of the recovery duct, and the recovery duct comprises an air exhaust duct.

In another embodiment, the recovery orifices are positioned below the level of the recovery duct, and the recovery duct comprises an air exhaust duct.

In another embodiment, the blocking device comprises a control valve positioned at the recovery orifices.

BRIEF DESCRIPTION OF THE DRAWINGS

The invention will be understood better and further advantages will become apparent on reading the detailed description of an embodiment given by way of example, the description being illustrated by the appended drawing, in which.

For the sake of clarity, these figures are not shown to scale. Furthermore, the same elements will bear the same references in the various figures.

DETAILED DESCRIPTION

Figure 1:
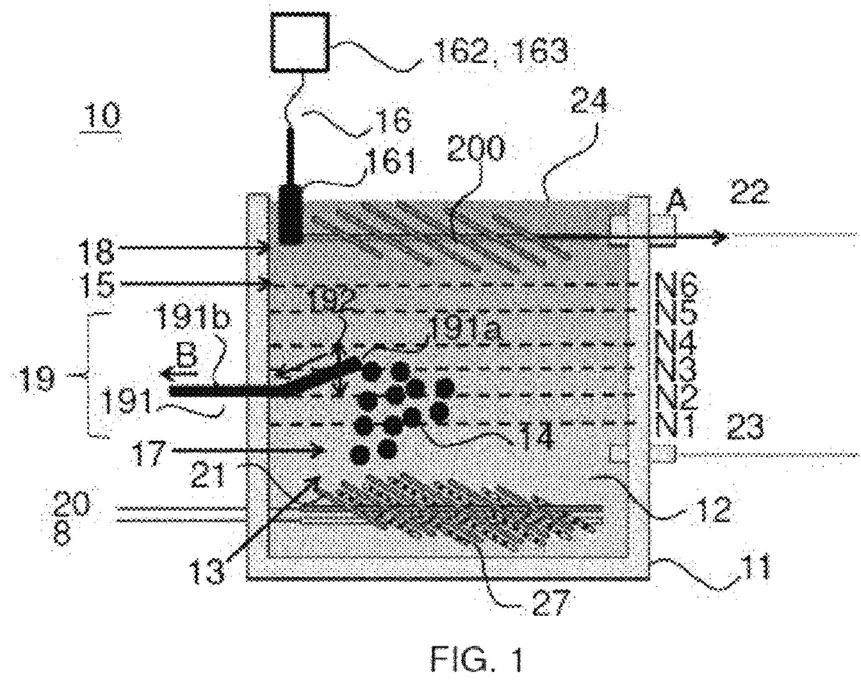
FIG. 1 schematically shows an example of a sequencing batch reactor suitable for implementing the treatment method according to the invention.

FIG. 1 schematically shows an example of a sequencing batch reactor 10 suitable for implementing the treatment method according to the invention. The invention relates to an installation for treating a wastewater effluent in a sequencing batch reactor 10 (SBR). According to the invention, the SBR 10 comprises:

- a chamber 11 that is able to contain a mixture 12 of wastewater or treated water and sludge comprising different levels, each level being defined by a concentration and/or a density of sludge,
- a sludge bed 13 situated at the bottom of the chamber 11,
- a device for supplying the SBR with a volume of effluent 20 to be treated close to the bottom of the chamber 11, in the sludge bed 13, preferably via a distribution network 21 covering the bottom of the chamber, means 200 for recovering a clarified fraction of the contents 12 of the chamber 11, the SBR 10 being able to implement a treatment method comprising a biological treatment reaction sequence 102 comprising at least a step 105 of aerating the contents of the chamber 11, during which the level of the surface 24 of the mixture 12 rises, and optionally a decanting step 106, during which sludge is deposited on the bottom of the chamber 11 and the contents of the chamber 11 are clarified close to the surface 24 thereof, a step 107 of recovering the clarified fraction 22 of the contents of the chamber 11, said recovery step 107 and supply step 101 taking place simultaneously, so as to keep the level of the contents of the chamber 11 substantially constant during the recovery step 107 and supply step 101, the installation also comprising means 210 for controlling the recovery means 200 for recovering the clarified fraction from the chamber. In the following text, the term recovery/recover should be understood as meaning evacuation/evacuate and/or drainage/drain. The aeration of the contents of the chamber is effected with air 8 via a distribution network 27, preferably covering the bottom of the chamber 11.

Figure 2:
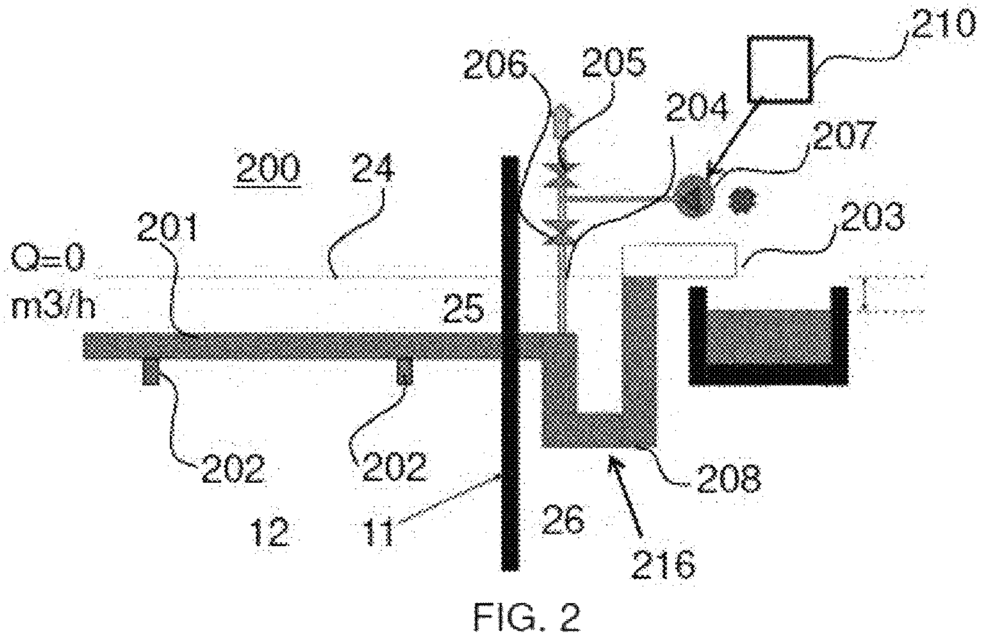
FIG. 2 schematically shows the chamber of the SBR and the recovery means.

FIG. 2 schematically shows the chamber 11 of the SBR 10 and the recovery means 200. The means 200 for recovering a clarified fraction of the contents 12 of the chamber 11 comprise:

- a recovery duct 201 extending below the surface 24 of the contents 12 of the chamber 11, between the interior 25 and the exterior 26 of the chamber 11, comprising:
  - a plurality of channels 202 hydraulically connecting the contents 12 of the chamber 11 and the recovery duct 201,
  - a plurality of recovery orifices 203 via which the clarified fraction of the contents 12 of the chamber 11 is intended to be drained,
  - an air duct 204 hydraulically or aeraulically connecting the recovery duct 201 to the atmosphere,
- an air exhaust valve 205 on the air duct 204, which is able to take up an open position or a closed position, via which the air blocked in the recovery duct can be evacuated to the atmosphere,
- an air/water blocking device 216 on the recovery duct 201, which is able to pass from a state referred to as closed to a state referred to as open, and vice versa, so as to block the air in the recovery duct 201 upstream of the air/water blocking device 216 and to block the water downstream of the air/water blocking device 216,
- an air injector 207 connected to the recovery duct 201 and intended to supply the recovery duct 201 with boosted and/or compressed air.

In order to make the figures clearer, two channels 202 are shown. However, it should be understood that the recovery duct may comprise several other channels 202, with a particular disposition: the channels 202 are distributed so as to cover the surface and to form a network of channels and of removal orifices. In other words, the channels 202 are disposed along the duct 201. The plurality of channels forms a plurality of inlet points for the clarified water into the duct 201. For a volume of liquid to be evacuated via the duct 201, this results in a lower flow rate per channel. By contrast to a device with a single water inlet channel, this disposition of the invention makes it possible to avoid the creation of currents liable to create surface turbulence, which would have a negative effect on the quality of the recovered water.

The water removal orifices 203 may be in the form of elongate or circular slots.

The air/water blocking device 216 will be described in detail below in the form of two exemplary embodiments. This device may be a valve, preferably a motorized valve, that can take up the open or closed position or a U-shaped siphon that can be primed or unprimed. In the following text, the air/water blocking device 216 is referred to as open if the valve is in the open position or the siphon is primed, and is referred to as closed if the valve is closed or the siphon is unprimed.

The recovery means 200 may comprise an air injector 207 connected to the air duct 204 between the exhaust valve 205 and the air/water blocking device 216 and may be intended to supply the recovery duct 201 with boosted/compressed air. The air for blocking the recovery duct may alternatively come from the air source used in the treatment method. More specifically, the air injector 207 may be dedicated to air/water blocking. In this case, it comprises a non-return valve. The air injector 207 may also not be dedicated to air/water blocking, meaning that the air injector may come from the supply of air of the chamber. In this case, the recovery means 200 also comprise a blocking valve 206 to provide the blocking function. The air injector 207 is not necessarily connected to the air duct 204, but it is systematically connected to the recovery duct 101 in order to block it with air/water.

The air injector 207 may operate intermittently during the aeration step 105, or continuously.

The exhaust valve 205 corresponds to a venting valve.

The control means 210 of the recovery means 200 aim to fill the recovery duct 201 with air until the recovery duct 201 has been completely emptied of the clarified fraction contained in the recovery duct 201, to keep the recovery duct 201 filled with air during the aeration step 105 and during the decanting step 106, and to evacuate the air contained in the recovery duct 201 with the clarified fraction 22 during the supply step 101 and the recovery step 107. More specifically, the control means 210 are configured to actuate the valve 205 and the blocking device 216 as required in order that the recovery duct is emptied of the clarified fraction present in the recovery duct 201 and keep the recovery duct 201 filled with air during the aeration phase and the decanting phase. The air may be supplied continuously. It may also come from an external air source, that is to say one not dedicated to air/water blocking, and be provided for the aeration of the chamber. In the case of an external air source, an isolation valve 206 is necessary. When the recovery means 200 comprise an air injector 207 dedicated to air/water blocking, this may inject boosted and/or compressed air into the recovery duct 201. It should be noted that this dedicated air injector 207 has a non-return valve (not shown in the figures). In other words, the recovery duct 201 is then blocked with air: it is filled with air which cannot then be evacuated on account of the closure of the air/water blocking device 216 and the exhaust valve 205. During the aeration phase, the level of the contents of the chamber increases on account of the introduction of air into the chamber and the level of the contents rises. The level of the contents of the chamber goes up. However, since the recovery duct is filled with air, these contents cannot pass into the duct. This has the advantages of avoiding a loss of sludge from the system (the presence of sludge being important for densifying), and of avoiding the contamination of the recovery duct and of the clarified water leaving the orifices 203 (this is important as regards the tertiary treatment that would need to be carried out downstream, and/or as regards the waste standards), the channels 202 make it possible to compensate the gas retention raising the level of water in the reactor during aeration, and they also compensate imperfect horizontality of the pipes.

The contents rise in the channels 202 in the case of discontinuous air injection, but cannot enter the recovery duct 201. This configuration ensures, by virtue of the control of the recovery means, that only the clarified fraction enters the recovery duct, without any risk of the contents containing sludge passing into the latter.

It is important to emphasize that the recovery duct extends below the surface 24 of the contents of the chamber. It is therefore permanently submerged in the contents of the chamber. The channels 202, which are tubes with inlet orifices, are permanently submerged and are filled with the contents of the chamber (with clarified water (during supply/recovery and the anaerobic step) or with air (during the reaction step and therefore the aeration step, and the decanting step)). In other words, the contents of the channels vary depending on the ongoing sequence. The channels 202 have a dual role: they form an access for the clarified fraction to the recovery duct 201 during the supply/recovery step, and they form a buffer volume, without access to the recovery duct 201, which contains the contents of the chamber when the level of the contents of the chamber rises on account of the aeration. The passage from role of allowing access to the recovery duct to that of a buffer volume takes place depending on the progress of the treatment method, by virtue of the injection/exhaust of boosted and/or compressed air and the opening/closing of the blocking device and of the exhaust valve. The injection/exhaust of boosted and/or compressed air and the opening/closing of the blocking device and of the exhaust valve are controlled by the means 210 for controlling the recovery means 200.

In one embodiment, the air/water blocking device 216 comprises a U-shaped siphon 208 between the air duct 204 and the recovery orifices 203. When the injection of air takes place, the clarified water contained in the siphon and in the recovery duct is replaced with air up to an equivalent height at the ends of the channel or channels. By this means, the siphon aims to hydraulically disconnect the contents of the chamber from the clarified water outside the chamber, and it is thus unprimed. By extending the height of the siphon, it is also possible to compensate the rise in the level of the surface 24 during the aeration step. The presence of a siphon is not absolutely necessary and other embodiments are possible and will be presented below. The siphon may be combined with a blocking valve 206 which is also controlled by the control means 210 if the air for filling the recovery duct comes from the air for treatment (air injector 207 not dedicated to blocking with air). A recovery orifice 203 is an orifice through which the treated water is evacuated.

The recovery orifices 203 are advantageously positioned above the level of the recovery duct 201. And advantageously, the recovery duct 201 comprises an air exhaust duct 211. Here too, other embodiments are possible and will be presented below.

Figure 3:
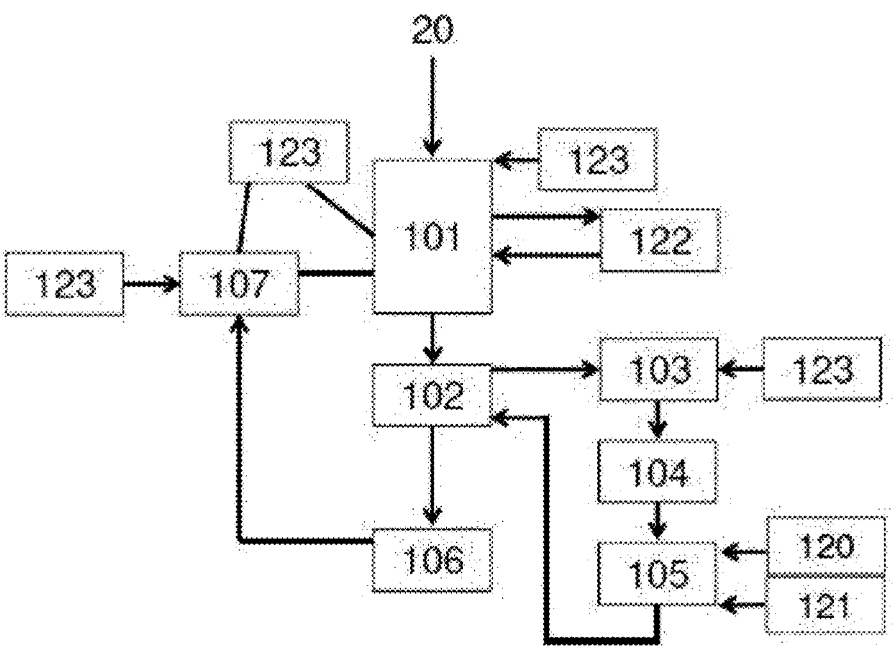
FIG. 3 shows a flowchart of the steps in the method for treating a wastewater effluent according to the invention.

FIG. 3 shows a flowchart of the steps in the method for treating a wastewater effluent according to the invention in an SBR 10. As explained above, the SBR 10 comprises:

- a chamber 11 that is able to contain a mixture 12 of wastewater and sludge comprising different levels, each level being defined by a concentration and/or a density of sludge,
- a sludge bed 13 situated at the bottom of the chamber 11,
- a device for supplying the SBR with a volume of effluent to be treated close to the bottom of the chamber 11, in the sludge bed 13, preferably via a distribution network 21 covering the bottom of the chamber, means 200 for recovering a clarified fraction of the contents 12 of the chamber 11, and means 210 for controlling the recovery means.

The recovery means 200 have been described on the basis of FIG. 2.

The method for treating a wastewater effluent in a sequencing batch reactor (SBR) 10 according to the invention comprises:

- a step 101 of supplying the SBR 10, during which a volume of effluent 20 to be treated close to the bottom of the chamber 11 is introduced, in the sludge bed 13, preferably via a distribution network 21 covering the bottom of the chamber 11,
- a biological treatment reaction sequence 102 comprising at least a step 105 of aerating the contents of the chamber, during which the level of the surface 24 of the mixture 12 rises.

The injection of air may be effected by a non-dedicated air distribution system with an isolation valve 206 such as an air distribution device, for the aeration step 105, or may also be effected by a dedicated distribution system (a compressor or a booster for example) advantageously comprising a non-return valve.

The method of the invention also comprises:

- a decanting step 106, during which sludge is deposited on the bottom of the chamber 11 and the contents of the chamber 11 are clarified close to the surface 24 thereof,
- a step 107 of recovering the clarified fraction 22 of the contents of the chamber 11, said recovery step 107 and supply step 101 taking place simultaneously, so as to keep the level of the contents of the chamber 11 substantially constant during the recovery step 107 and supply step 101.

The method according to the invention may also comprise a waiting phase 116 linked with the supply step, decanting step or anaerobic step.

According to the invention, the treatment method comprises:

- a step 120 of controlling the recovery means 200, during which the recovery duct 201 is filled with air until the recovery duct 201 has been completely emptied of the clarified fraction 22 contained in the recovery duct 201, and the recovery duct 201 is kept filled with air during the reaction sequence 102 and preferably also during the decanting step 106, and optionally the waiting step, and
- a step 123 of expelling the air contained in the recovery duct 201 with the clarified fraction 22 during the supply step 101 and the recovery step 107.

After step 120 and before step 123, the method may comprise a step 121 of, at least partially, filling the channels 202 with the contents 12 of the chamber 11 during the aeration step 105, if the injection of air is not continuous during the air injection steps.

Moreover, the treatment method comprises, between step 120 and step 123, two other steps of keeping the recovery duct filled with air. As mentioned above, the step 120 of filling the recovery duct 201 with air takes place by simultaneous injection of air and drainage of clarified water. The valve 205 is closed and the air/water blocking device 216 is referred to as closed, the air injection device (the air injector 207) is in operation, at the start of the first aeration step 105.

Next, the method comprises a step 122 of keeping the recovery duct 201 filled with air by injection of air. The valve 205 is closed and the air/water blocking device 216 is referred to as closed, the air injection device 207 is in operation, during the aeration step 105.

Next, the method comprises a step **122*b* is of keeping the recovery duct filled with air without air injection. The valve 205 is closed and the air/water blocking device 216 is referred to as closed, the air injection device 207 is stopped, during the aeration step 105 and decanting step 106**.

Next comes the step 123 of simultaneously expelling air contained in the recovery duct and filling with clarified water. The valve 205 is open and the blocking device 216 is referred to as open, the air injection device 207 is stopped, during the supply step 101, recovery step 107, anaerobic step 103.

And finally, if the injection of air is not continuous during the aeration step 105, in particular to save energy, a step 121 of, at least partially, filling the channels 202 with the contents 12 of the chamber 11 during the aeration step 105 may take place (but this step is not desired to some extent). In this case, it is possible to reinject air to fill the recovery duct 201 again, this being step 122. This can be carried out in a syncopated fashion by regulating a frequency and a duration of air injection or more precisely by incorporating a level measurement probe which makes it possible to detect if it is necessary to reinject air and to trigger a step 122 during the aeration step 105.

The recovery duct is kept filled with air during the reaction sequence comprising the aeration step. Preferably, it is also kept filled with air during the decanting step. Specifically, if the recovery duct were no longer filled with air at the start of decanting, the sludge blanket would not have enough time to descend below the inlet orifices of the channels 202, and this would result in the contamination of the recovery duct by the sludge.

The particular feature of the invention resides in the positioning of the recovery duct 201 below the surface 24 of the contents of the chamber, meaning that it is always submerged. For all that, its contents are controlled by virtue of the step (120, 122, **122*b* is, 123) of controlling the recovery means 200 depending on the steps of the treatment method. As a result, only the treated water can penetrate into the recovery duct in order to be recovered. The recovery duct is depicted as being substantially horizontal, that is to say parallel to the surface 24 of the contents of the chamber, but it could also be inclined and extend along an axis that intersects the plane in which the surface 24 lies. The primary advantage is that of not limiting the volume of the chamber since it is not necessary to lower the water plane below the recovery duct to avoid ingress of untreated water and sludge during the aeration step 105. By virtue of the control of the recovery means, the recovery duct is filled with air just before the aeration step 105 of the reactor. In other words, the recovery duct is filled with air, meaning that it is blocked with air and thus rendered inaccessible to the contents of the chamber during the phases in which the contents of the chamber in the vicinity of the duct are not just treated water. Another particular feature arises from the channels 202** which hydraulically connect the contents of the chamber 11 to the recovery duct 201. They are depicted perpendicularly to the surface 24 but may also be inclined downwardly. The channels 202 play an important role: while ensuring the hydraulic connection between the clarified fraction and the recovery duct in order to allow the recovery of the clarified fraction, they also make it possible, during the aeration step, to contain the rise in the level of the contents of the chamber. The channels 202 each have two ends (visible in FIG. 4): a first end 221 and a second end 222 in direct contact with the recovery duct 201, allowing the flow between the recovery duct 201 and said channel 202. Each channel 202 can have any cross section: circular, rectangular, polygonal, etc., as can the recovery duct 201.

The aeration step 105 entails a variation in the level of the contents of the chamber due to the injection of air into the chamber. During the aeration step 105, the channels 202 are filled at least partially with the contents of the chamber. This is the particular case of step 121, for a method in which the injection of air into the recovery duct is not continuous. The filling height of the channels 202 corresponds to the height to which the contents of the chamber rise. Since the channels 202 are designed to be high enough to comply with the particular case of step 121, the contents 12 do not reach the second end 222 of the channels 202. For its part, the recovery duct 201 remains filled with air. During the aeration step 105, the contents of the chamber are uniform, even at the surface 24. By virtue of the channels 202, these uniform contents containing sludge do not pass into the recovery duct 201. The channels 202 form a transition zone between the recovery duct blocked with air and the contents of the chamber. The ends 221 of the channels 202 may be in contact with the water and the sludge. The ends 222 of the channels 202 are never in contact with sludge. This thus ensures that the recovery duct, depending on the phases, contains either air or treated water, but never sludge.

The recovery duct 201 is kept filled with air during the reaction sequence 102 and preferably the decanting step 106, and optionally the waiting phase 116. This is step 122*b* is. At the end of decanting, the sludge that is present in the chamber is deposited on the bottom of the chamber 11 and the contents of the chamber 11 are clarified close to the surface 24 thereof. The method then comprises a step 123 of expelling air from the recovery duct 201. The valve 205 is in an open position and clarified water enters the recovery duct and flushes out the air blocked in the recovery duct through the valve 205 and through the venting duct. There is no longer air blocked in the recovery duct.

Subsequently, the air/water blocking device 216 passes into the position referred to as the open position and a new cycle starts: the supply step 101 takes place simultaneously with the recovery step 107. By introducing a volume of effluent into the chamber, the same volume is drained in order to keep a substantially constant level. Since the recovery duct is no longer blocked with air, the recovery duct 201 and the channels 202 are filled with this volume of the contents 12 of the chamber 11 situated at the surface 24. This is the clarified fraction that is intended to be recovered.

The control of the filling of the recovery duct with air (step 120) and of the blocking of the air in the recovery duct (step 122*bi* s, optionally supplemented by step 122 if the injection of air is not continuous) results in precise control of the time at which the contents are made to pass into the recovery duct. The recovery duct is accessible to the contents of the chamber when the contents of the chamber have been clarified at the surface thereof. By contrast, during the aeration step, in which the contents are uniform, that is to say when the contents of the chamber have not been clarified at the recovery duct, the recovery duct is not accessible to these contents. In other words, the method according to the invention makes it possible to precisely control what enters the recovery duct. According to the steps of the treatment of the wastewater, there is a succession of phases of blocking the recovery duct with air and phases of free hydraulic connection, during which the contents of the chamber can circulate in the recovery duct.

FIGS. 4 to 9 schematically show the features of the recovery means of the SBR in different operating phases according to the invention. According to the depiction in FIG. 2, the recovery duct 201 is filled with clarified fraction. Just before the end of the supply step and recovery step and before the aeration step (or the air injection step 110), the recovery duct is not blocked with air. At this time, just before the aeration step, the level of the clarified fraction stabilizes at a reference level indicated Q=0 m3/h in FIG. 4 in the recovery duct in the case in which the recovery orifices 203 are positioned above the level of the recovery duct.

Figure 4:
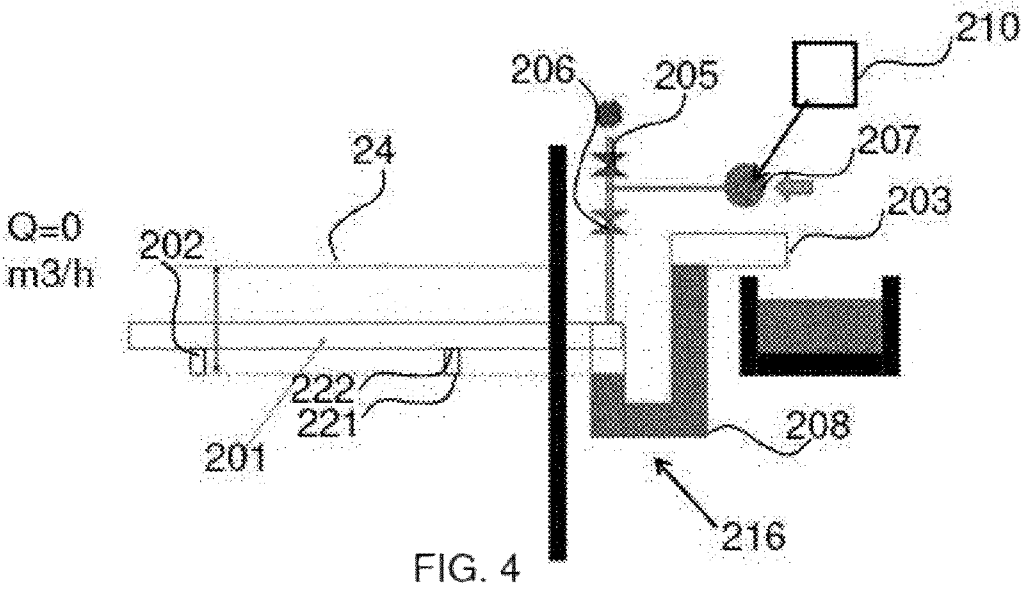
FIGS. 4, 5, 6, 7, 8 and 9 schematically show the features of the recovery means of the SBR in different operating phases according to the invention.

Between the depictions in FIGS. 2 and 4, the injection of air starts. The clarified fraction leaves through the recovery orifices 203. The exhaust valve 205 is in the closed position. The air cannot escape, the air remains in the recovery duct. As soon as the recovery duct is filled with air and the entire clarified fraction has left the recovery duct, all that is necessary is to add air in order to regulate the quantity of air throughout the aeration step. This is step 122. The recovery duct is thus filled with air, for the one part, and clarified fraction is kept in the downstream part of the siphon, for the other part. The aeration step then starts. Air is introduced into the chamber via an external air injector (that is to say one that is not dedicated to the blocking of the recovery duct with air) for the aeration of the contents of the chamber. Air can be added in addition into the recovery duct during the aeration in order to compensate the variations in pressure in the recovery duct, which will be associated with the variations in the height of water during the aeration. This is step 122.

Figure 5:
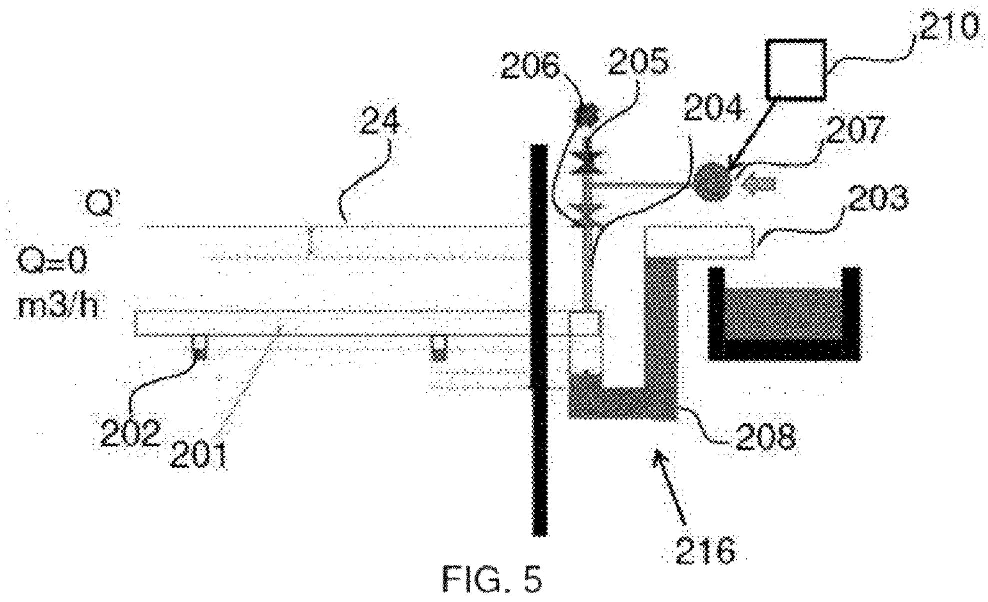

In FIG. 5, the aeration of the biomass has started. The level of the contents in the chamber has increased on account of the injection of air for the aeration step 105 (for example around 30 cm, symbolized by the level Q'). There is a slight increase in the pressure in the recovery duct on account of the increase in the level of the contents of the chamber. When use is made of a siphon as the air/water blocking device 216, the contents of the chamber enter the channels 202 and the level of the clarified fraction changes in the siphon (see the arrows in FIG. 5). The channels 202 need to be high enough to stabilize the level of the contents in the interior of the channels (and in order that these contents do not pass into the interior of the recovery duct) when the level of the contents of the chamber is highest (that is to say during the aeration step).

Figure 6:
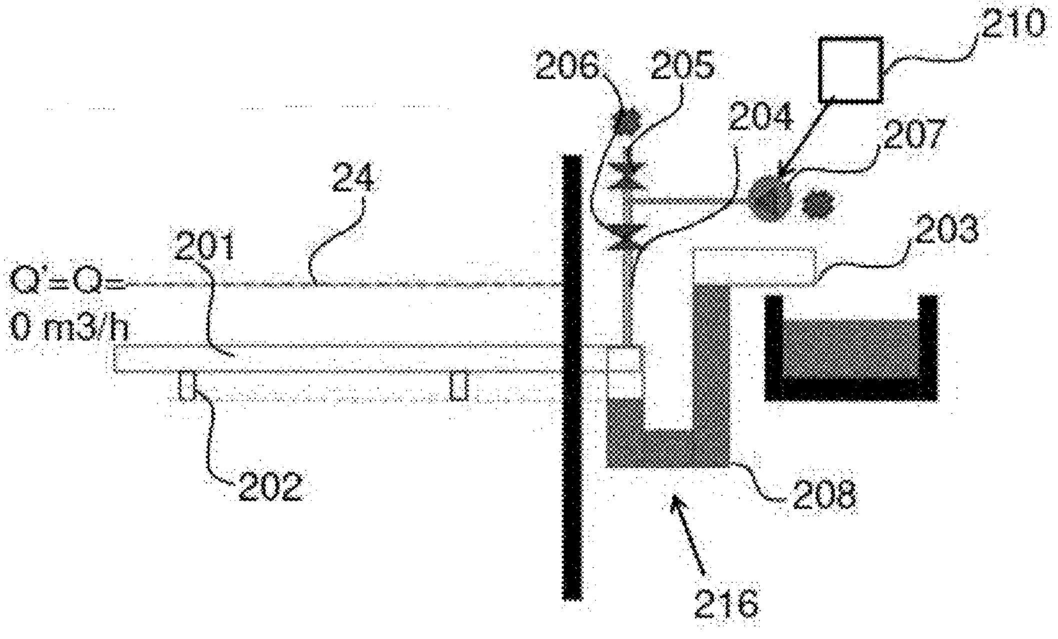

In FIG. 6, the aeration step is ending and the decanting step is starting. On account of the stopping of the air injection for the aeration, the level of the surface returns to the reference level denoted Q=0. The air is still blocked in the recovery duct in order to ensure that the non-decanted sludge remains in the chamber. The air/water blocking device 216 is referred to as being in the closed position and the valve 205 is closed, ensuring that the air is blocked in the recovery duct 201 upstream of the blocking device 216.

Figure 7:
Figure 7:
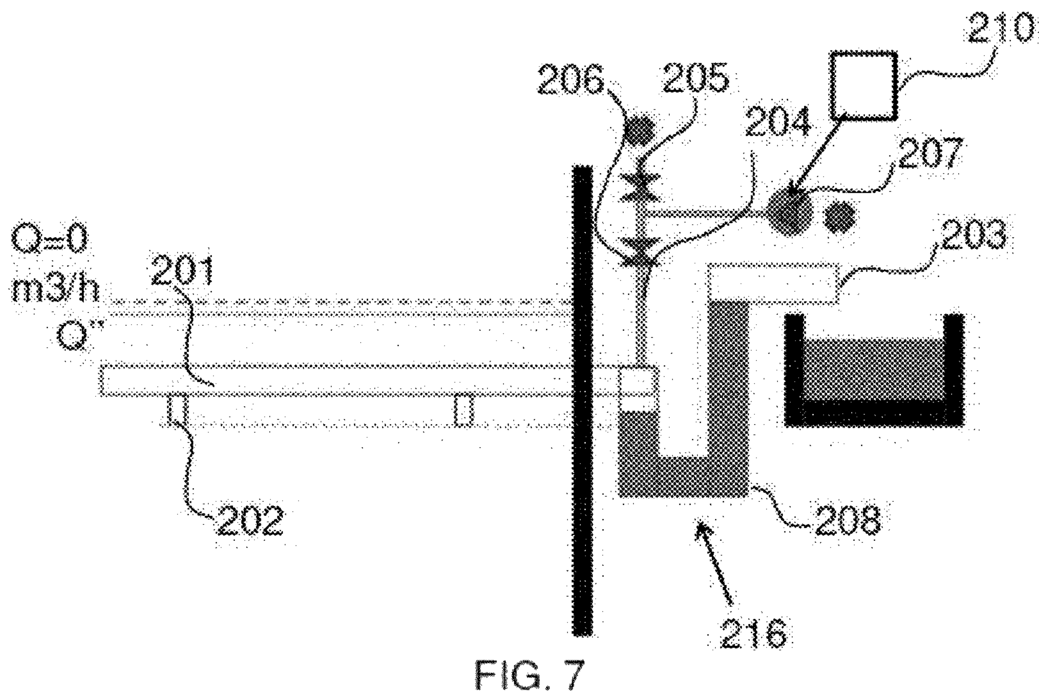

FIG. 7 shows the decanting step. Sludge can be extracted from the chamber. The level of the contents of the chamber decreases slightly (by a few centimeters). The level that has been decreased by the extraction of sludge is denoted Q".

Figure 8:
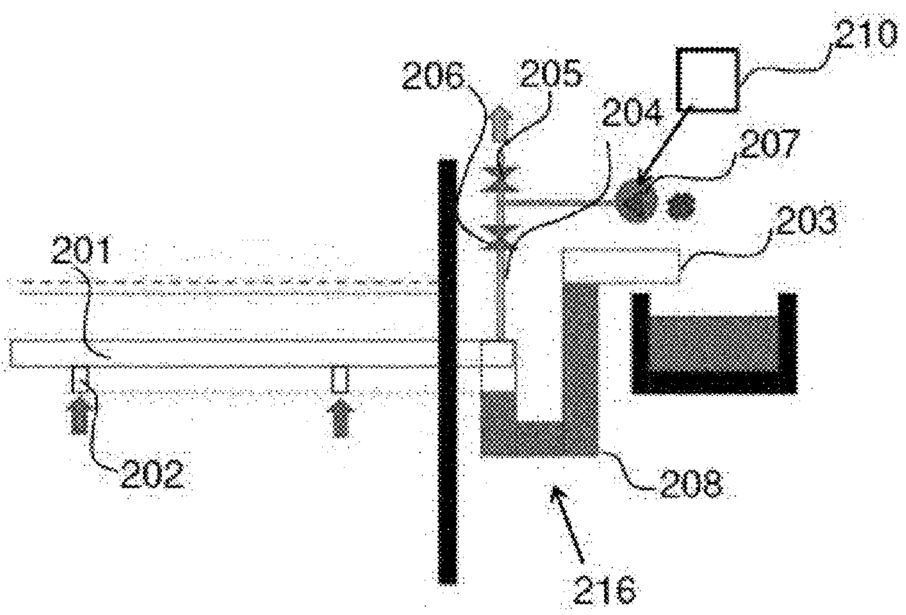

At the end of the decanting step 106 and/or at the start of the supply step 101 and recovery step 107, when the surface 24 of the chamber has been clarified, and all the sludge has been decanted and is disposed in the bottom of the chamber, the air exhaust valve 205 is put into the open position and the air/water blocking device 216 passes into the open position (meaning that the device 216 opens in the case of a motorized valve, or it is primed in the case of the siphon) in order to allow the clarified water to pass through. Clarified fraction enters the recovery duct and is drained through the recovery orifices 203 while flushing out air through the valve 205 and the venting duct 204. This step is shown in FIG. 8. At the end of the decanting step, the sludge is located away from the recovery duct and the channels 202. There is no longer a risk of sludge passing into the recovery duct. The air is unblocked: the valve 206 is closed in the case of an air injector not dedicated to the blocking of air, the exhaust valve 205 is open (as is the air/water blocking device 216), just before the supply step and recovery step. Advantageously, the air injection 207 does not operate during the decanting step 106: it operates only during steps of aeration or injection of air into the chamber.

Figure 9:
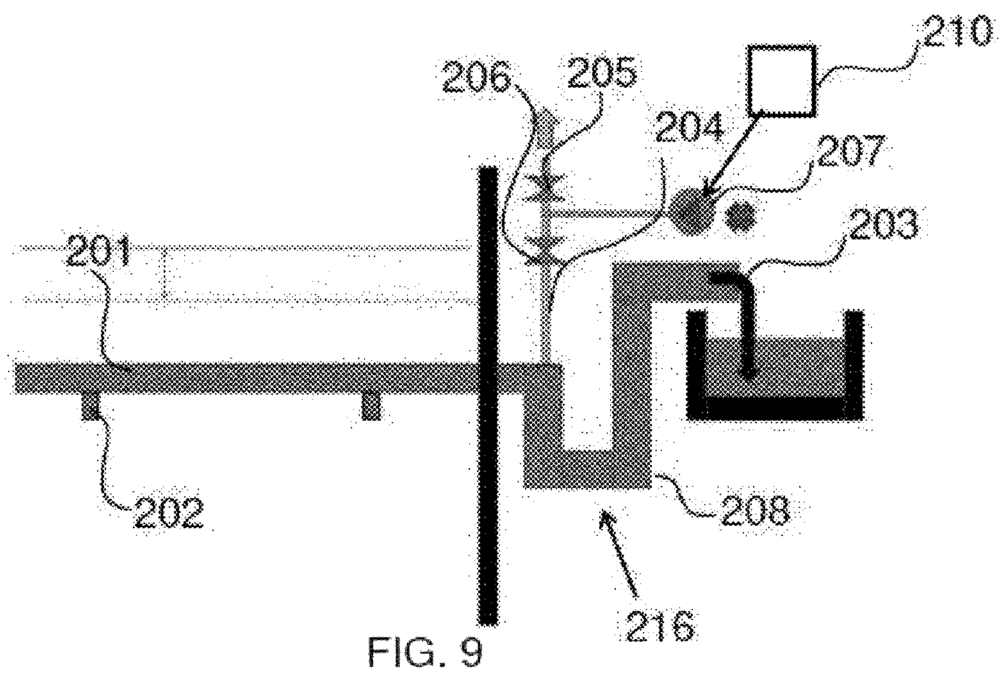

FIG. 9 shows the simultaneous steps of supply and recovery. By supplying the chamber with wastewater via the bottom of the chamber, the level of the contents increases in accordance with the pressure drops generated by the recovery means 200. The fraction of these contents that is located at the surface 24 is clarified (since it is just after the decanting step), and it is this fraction that passes into the recovery duct and which is drained through the recovery orifices 203. A new cycle will be able to start, repeating the control of the recovery means, as explained for FIG. 2.

In addition to the management of the air injection for filling the recovery duct with air, the means for controlling the recovery means also manage the opening and closing of the exhaust valve 205 and of the air/water blocking device 216. During the step 122 of filling the recovery duct 201 with air by way of the air injector, the exhaust valve 205 is in the closed position, and the air/water blocking device 216 is in the closed position (meaning that the device 216 is closed in the case of a motorized valve, or it is unprimed in the case of a siphon). The air/water blocking device 216 blocks the air in the recovery duct 201 by creating a hydraulic discontinuity between upstream and downstream of the air/water blocking device 216. Before the supply step 101, during the step 123 of expelling the air from the duct, the exhaust valve 205 is in an open position so as to allow the evacuation of the air simultaneously with the inlet of clarified water into the recovery duct and then the air/water blocking device 216 takes up the position referred to as open so as to allow the clarified fraction 22 to leave through the recovery orifices 203.

Figure 10:
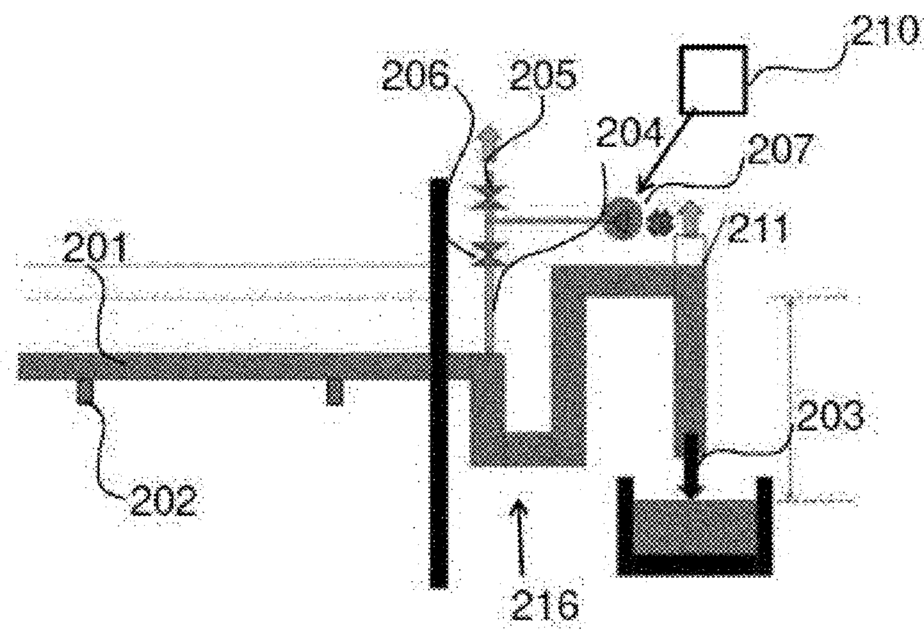
FIGS. 10, 11 and 12 schematically show embodiment variants of the recovery means of the SBR according to the invention.
Figure 11:
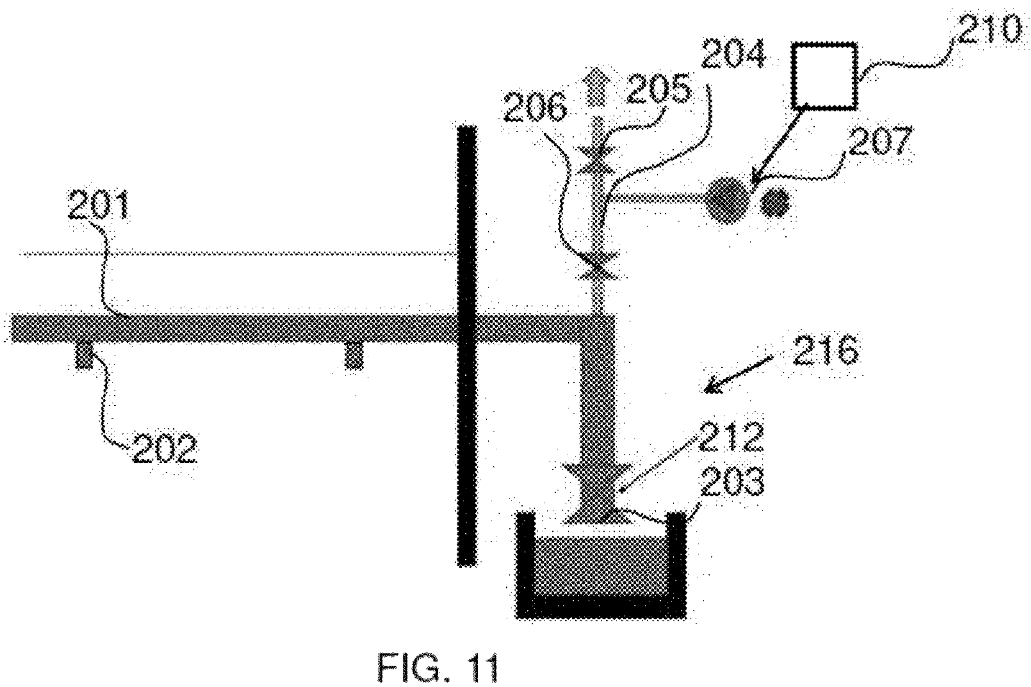
Figure 12:
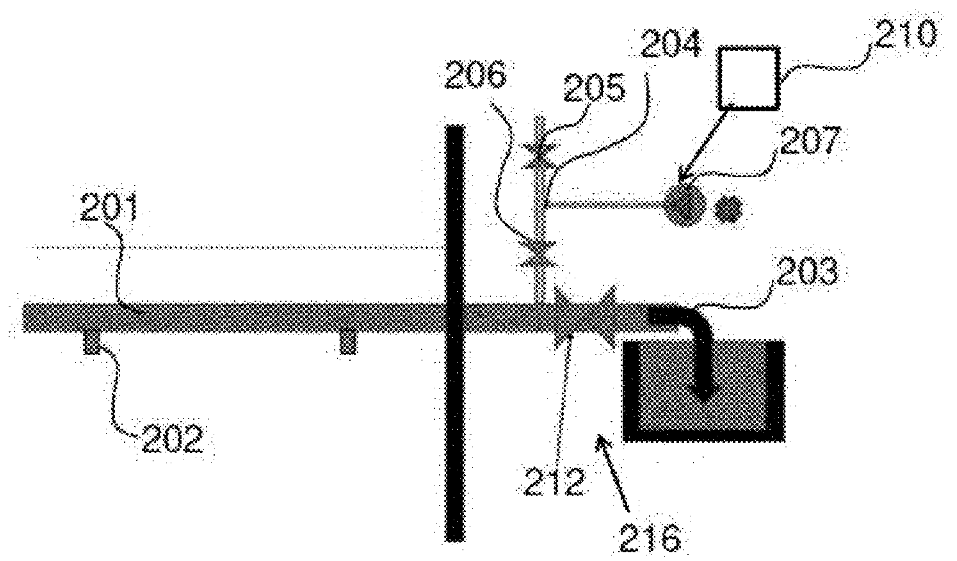

FIGS. 10 to 12 schematically show embodiment variants of the recovery means of the SBR according to the invention.

In the embodiment presented in FIG. 10, the recovery orifices 203 are positioned below the level of the recovery duct 201, and the recovery duct 201 comprises an air exhaust circuit 211 to ensure proper air evacuation.

In the embodiment presented in FIG. 11, the recovery orifices 203 are positioned below the level of the recovery duct 201, and the air/water blocking device 216 comprises a control valve 212 (advantageously motorized, in particular a motorized valve coupled to a flow rate control device) positioned upstream of the recovery orifices 203. The control valve 212 is intended to hydraulically disconnect the water in the chamber from the water outside the chamber and to block the air upstream of the device 216; it also makes it possible to keep a constant level of the surface of the reactor during the supply step 101 and the recovery step 107 by limiting the generation of hydraulic jerks downstream of the recovery orifices 203. The control valve 212 is thus closed during the disconnection after the supply step 101 and recovery step 107 and before the aeration step 105 (or the air injection step 110). The control valve is open during the air expulsion step 123 in order then to allow the clarified fraction to pass through the recovery orifices 203. It should be noted that, for the blocking function, the valve 212 is not necessarily a control valve (a simple opening/closing valve is sufficient).

Lastly, as shown in FIG. 12, the invention also relates to a recovery duct in which the recovery orifices 203 are positioned substantially at the same level as the recovery duct. In this case, the recovery means 200 also comprise a control valve 212 positioned upstream of the recovery orifices 203.

Figure 13:
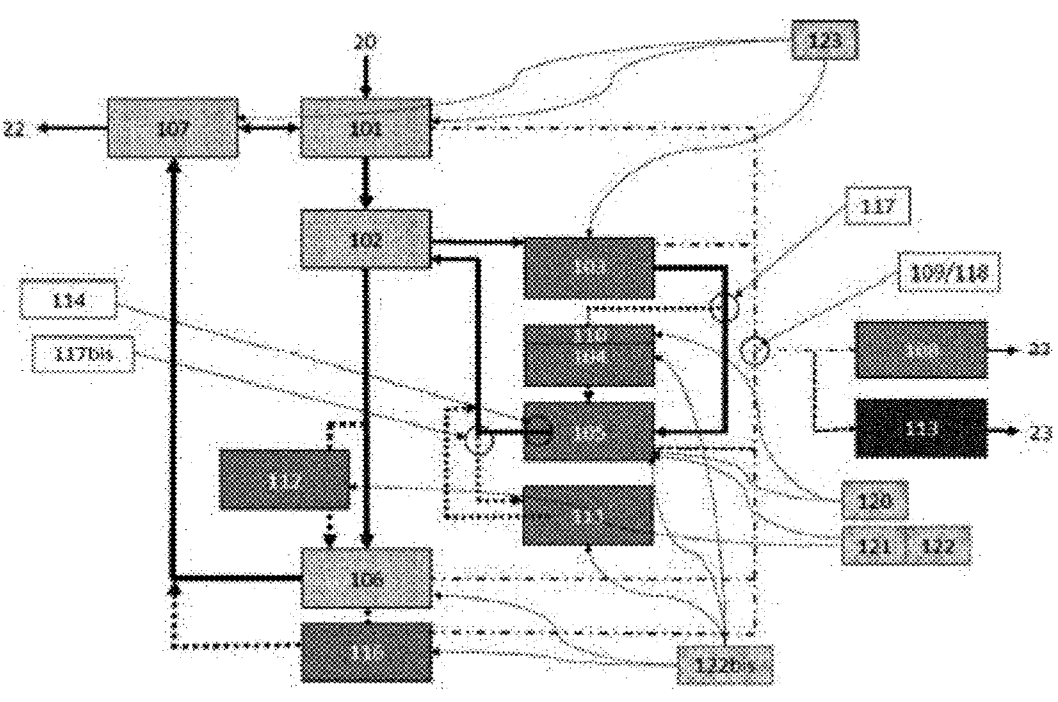
FIG. 13 shows a flowchart of the steps in a variant of the method for treating a wastewater effluent according to the invention in an SBR.

FIG. 13 shows a flowchart of the steps in a variant of the method for treating a wastewater effluent according to the invention in an SBR 10. The SBR 10 according to this variant of the invention makes it possible to selectively extract the sludge that is least able to be decanted and is located in the mixture 12.

In this embodiment, the SBR 10, visible in FIG. 1, comprises extraction means 19 that are able to extract sludge 23 (depicted schematically for ease of understanding) at variable levels between the minimum extraction level 17 and the maximum extraction level 18 (the arrow B represents the sludge outlet). By way of nonlimiting example, the extraction means 19 may comprise an extractor 191 comprising at least a first part having at least one opening 191*a* inside the chamber 11 and a second part 191*b* that is able to take the sludge out of said chamber. The extraction means 19 may comprise variation means 192 that are able to vary the position of the opening 191*a* of said extractor 191, in particular the level of said opening between the minimum extraction level 17 and the maximum extraction level 18. The extractor 191 advantageously comprises a (suction) pump or a gravity valve (these not being shown) for the extraction of the sludge. Advantageously, the extractor 191 may comprise a set of tubes disposed at different levels in the chamber 11, each tube comprising a first end having an opening inside the chamber 11 and a second end connected to the second part 191*b* of the extractor 191, the variation means 192 comprising a set of valves that are able to open or close said tubes. The extraction means thus allow the extraction of the sludge at one level or at variable levels. To make the figure easier to read, the extraction means 19 are shown in the left-hand part of the SBR, but the second part 191*b* for the outlet of sludge is intended to be linked to the extracted sludge 23.

The means 16 for determining the minimum level 17 and the maximum level 18 of extraction of the sludge 23 from the chamber 11 may comprise measurement means 161 that are able to measure the concentration at different levels of a mixture of wastewater and sludge. For example, a sludge blanket probe makes it possible to measure the surface of the sludge bed. An SM (suspended matter) probe makes it possible to measure the concentration of the sludge. Several probes may be disposed over the height of the chamber in order to measure the concentration of suspended matter at different levels. These measurements are used to determine the levels 17, 18. The means 16 may comprise selection means 162 that are able to select a maximum sludge concentration value and a minimum sludge concentration value, and a volume of sludge to be extracted. The selection may be made by an operator or on the basis of a calculation linked to the sludge age. The means 16 may comprise deduction means 163 that are able to deduce a minimum extraction level corresponding to the maximum concentration value selected and a maximum extraction level corresponding to the minimum concentration value selected.

The measurement means 161 may comprise for example a measurement probe. Said measurement probe makes it possible to measure the concentration of sludge in the mixture. The measurement probe 161 is submerged in the mixture as illustrated. It may be at a fixed or variable submersion depth depending on the type of probe chosen. Or, as stated above, there may be several measurement probes over the height of the chamber. The measurement probe 161 is connected to the selection means 162, which make it possible to verify whether or not the measurement corresponds to sludge to be extracted, and to the deduction means 163, which make it possible to connect the measurement to the corresponding extraction level. These determining means 16 are connected to sludge extraction means 19, more particularly to the means 192 for varying the extraction level, mainly for selecting the extraction level. The variation means 192 vary the level of the opening 191a of the extractor 19, or it is possible to extract selectively at fixed extraction levels and at variable times depending on the development of the contents, for example during the decanting, waiting, supply/recovery, anaerobic step depending on the measurement of the sludge blanket, or non-selectively during the aeration step.

By way of nonlimiting example, the measurement means 161 of the determining means 16 comprise an ultrasonic sensor submerged beneath the surface of the mixture of wastewater and sludge. The ultrasonic sensor makes it possible to send an ultrasonic wave into said mixture (it then functions as an emitter) and then to receive a return ultrasonic wave once it has traveled over a given distance in the mixture of wastewater and sludge (it then functions as a receiver). The sensor is connected to the selection means 162 and to the deduction means 163.

FIG. 13 shows the flowchart of the steps in the variant method for treating a wastewater effluent according to the invention. In this variant, the treatment method according to the invention comprises:

- a step 101 of supplying the SBR 10, during which a volume of effluent 20 to be treated close to the bottom of the chamber 11 is introduced, in the sludge bed 13, preferably via a distribution network 21 covering the bottom of the chamber 11
- a reaction sequence 102 comprising:
  - at least a first anaerobic step 103, during which the PAOs 14 capture the carbon-based pollution and leach the phosphorus-based compounds, optionally, a second, anoxic, denitrification step 104, this step only being implemented in the event of a NOx concentration higher than a predetermined threshold,
  - a third, aeration step 105, making it possible to effect dephosphatation of the effluent by the PAOs 14, the aeration being controlled so as to simultaneously carry out either (partial or total) nitrification or (partial or total) nitritation,
- a decanting step 106, during which sludge is deposited on the bottom of the chamber 11 and the contents of the chamber 11 are clarified close to the surface 24 thereof,
- a recovery step 107, during which a clarified fraction 22 of the contents of the chamber is evacuated, said recovery step 107 and supply step 101 taking place simultaneously, so as to keep the level of the contents of the chamber 11 substantially constant during the recovery step 107 and supply step 101, and a step 108 of extraction of at least a part of the light sludge 23 at a predefined level between the minimum extraction level 17 and the maximum extraction level 18, preferably close to the sludge blanket 15.

Typically, the supply step 101 is carried out in an anaerobic state, or even in an anoxic state. In the latter case, the anoxic step 101 allows denitrification. The anaerobic step 103 is carried out in an anaerobic state, and the aeration step 105 is carried out in an aerobic state. The decanting step 106 is carried out in an anaerobic state and then an anoxic state.

The second step 104 may be linked to a step 117 for measuring the concentration of NOx in the chamber.

The treatment method according to the invention may also optionally comprise a fourth, anoxic denitrification or denitritation or deammonification step 111. More specifically, essentially three variants will be envisioned: according to the first variant, the third step 105 comprises total or partial nitrification, and the anoxic step 111 is denitrification (post-denitrification method); according to a second variant, the third step 105 comprises total or partial nitritation, and the anoxic step 111 is denitritation (post-denitritation method); lastly, according to a third variant, the third step 105 comprises partial nitritation, and the anoxic step 111 is deammonification (method referred to as "ANAMMOX"). The fourth step 111 may be linked to a step 117b is for measuring the concentration of NOx in the chamber.

The step 101 of supplying through the sludge bed makes it possible to bring the sludge into contact with the raw water to be treated. The volume of wastewater 20 to be treated is introduced through the sludge bed, in which the PAOs are located. Thus, the particles and the soluble fraction of the volume introduced are rendered accessible to the bacteria. By virtue of the anaerobic step 103, the PAOs capture the carbon-based pollution and leach the phosphorus-based compounds. The aeration step 105 allows the dephosphatation of the contents of the chamber by the PAOs. The reaction sequence 102 contributes to the development of the PAOs, which exhibit good decantability. During the decanting step 106, the sludge is deposited by gravity in the bottom of the chamber. The heavy sludge and the PAOs are deposited more rapidly than the light sludge. They contribute to the sludge bed. The light sludge exhibits less good decantability. It remains longer in suspension in the contents of the chamber, above the sludge bed.

The step 108 of extracting at least a part of the light sludge makes it possible to extract the least decantable sludge on each cycle. However, the extraction is not necessarily linked to each cycle depending on the exploitation constraints. For example, it is possible not to carry out the extraction at the weekend. As a result, only the sludge exhibiting good decantability is preserved in the chamber of the SBR. In addition to treating the pollution present in the introduced effluent, the combination of the action of the PAOs producing denser sludge and the extraction of the light sludge densifies the sludge present in the chamber. As a result, the method according to the invention, referred to as the densified sludge method, makes it possible to achieve higher sludge decanting speeds, regardless of the nature of the sludge present in the chamber of the SBR.

During the reaction sequence 102, when the latter comprises a second step 104, it is possible for there to be a step 110 of injecting air into the chamber 11. It is also during this step 110 that air can be injected simultaneously into the recovery duct to realize the air blocking according to step 120. The injection of air into the chamber before step 104 makes it possible to put the biomass into suspension for a better mixture with the supernatant rich in oxidized nitrogen (nitrate NO3 and nitrate NO2), thereby improving the performance of the denitrification of the supply step 104, and also the performance of the first, anaerobic step 103. It should be noted that this step 110 is optional, if the second, optional step 104 is activated, depending on the measurement of the NOx concentration.

The decanting step 106 may be preceded by a step 112 of injecting air into the chamber 11. It is also during this step 112 that air can be injected simultaneously into the recovery duct to realize the air blocking according to step 122. The injection of air into the chamber before the decanting step makes it possible to homogenize the contents of the chamber and to bring the sludge into contact with the oxidized nitrogen species. Moreover, the injection of air also makes it possible to degas dinitrogen.

Moreover, the treatment method according to the invention may comprise a step 113 of densifying the sludge using a densifying device 30 inside or outside the chamber 11. The densifying device 30 may be a screen of suitable size disposed upstream of the means for extracting sludge in order to retain the largest flocs and thereby improve the selection, that is to say the keeping thereof in the chamber, of the particles that are decanted most easily. Alternatively or in addition, the step of densifying the sludge may consist in adding ballasting agents (such as zeolites).

Advantageously, the treatment method according to the invention comprises a step 114 of feedback-controlling the duration of the third, aeration step 105 depending on the level of pollution in the wastewater effluent 20, in particular depending on the concentration of NH4 and/or of $NO_2^-$ and/or of $NO_3^-$ in the contents of the chamber. More specifically, it is the pollution of the raw water that is measured indirectly as soon as the contents of the chamber have been aerated at least once.

This variant of the method is referred to as the "densified sludge" treatment variant, making it possible to achieve higher decanting speeds of the sludge, regardless of the nature of the sludge (granular or non-granular), and advantageously with non-granular sludge. In this variant, the densification of the sludge is achieved in a constant-level SBR by optimization of the production of easily decantable microorganisms, by virtue of the combination of several factors and in particular with a sludge extraction strategy which makes it possible to preserve, in the reactor, sludge with the best decantability, by extracting the least decantable sludge on each cycle.

Figure 14:
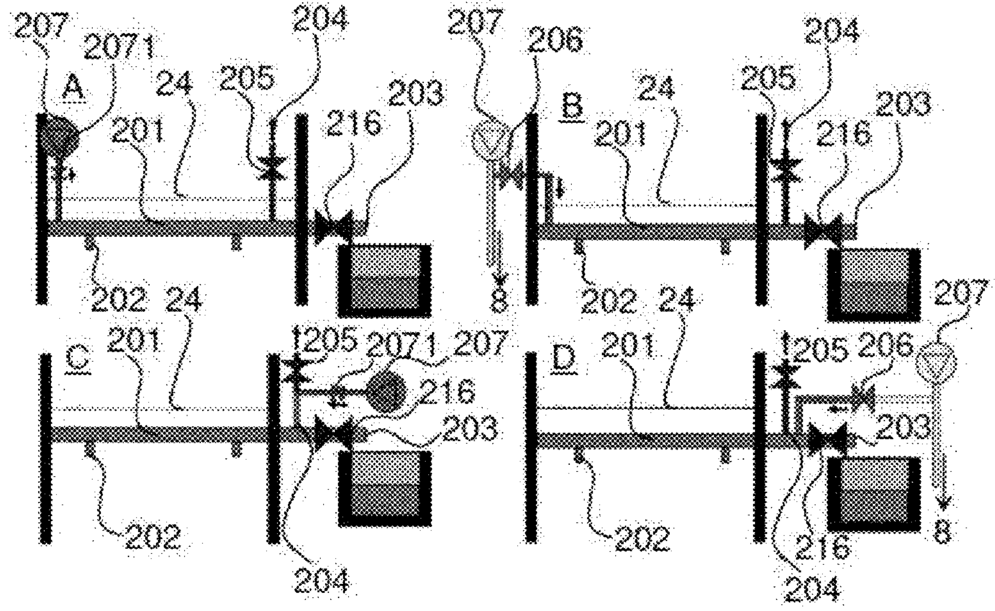
FIG. 14 schematically shows variants of the recovery means of the SBR.

FIG. 14 schematically shows variants A, B, C, D of the recovery means of the SBR. In the variants A and C, the air injector 207 is dedicated to air/water blocking. In this case, it comprises a non-return valve 2071. In the variants B and D, the air injector 207 is not dedicated to air/water blocking, meaning that the air injector 2071 is also intended to supply the chamber with air. In this case, the recovery means 200 also comprise a blocking valve 206 to provide the blocking function. The air injector 207 may be connected to the air duct 204 (variant C), but does not have to be. By contrast, the air injector 207 has to be connected to the recovery duct 101 for air/water blocking.

It will be apparent more generally to a person skilled in the art that various modifications may be made to the embodiments described above, in the light of the teaching that has just been disclosed to said person. In the claims which follow, the terms used should not be interpreted as limiting the claims to the embodiments set out in the present description, but should be interpreted to include therein all of the equivalents that the claims are intended to cover by virtue of their wording and as may be foreseen by a person skilled in the art on the basis of their general knowledge.

The invention claimed is:

1. A method for treating a wastewater effluent in a sequencing batch reactor (SBR), said SBR comprising:
- a chamber that is able to contain a mixture of wastewater and sludge comprising different levels, each level being defined by a concentration and/or a density of sludge, a sludge bed situated at the bottom of the chamber,
- means for recovering a clarified fraction of the contents of the chamber, comprising:
  - a recovery duct extending below the surface of the mixture in the chamber, between the interior and the exterior of the chamber, comprising:
    - a plurality of channels hydraulically connecting the contents of the chamber and the recovery duct,
    - a plurality of recovery orifices via which the clarified fraction of the contents of the chamber is intended to be drained,
    - an air duct hydraulically or aeraulically connecting the recovery duct to the atmosphere,
  - an air exhaust valve on the air duct, which is able to take up an open position or a closed position,
  - an air/water blocking device on the recovery duct, which is able to pass from a state referred to as closed to a state referred to as open, and vice versa, so as to block the air in the recovery duct upstream of the air/water blocking device and to block the water downstream of the blocking device,
  - an air injector connected to the recovery duct and intended to supply the recovery duct with boosted and/or compressed air, said method comprising:
- a step of supplying the SBR, during which a volume of effluent to be treated close to the bottom of the chamber is introduced, in the sludge bed,
- a biological treatment reaction sequence comprising at least:
  - a step of aerating the contents of the chamber, during which the level of the surface of the mixture rises,
- a decanting step, during which sludge is deposited on the bottom of the chamber and the contents of the chamber are clarified close to the surface thereof,
- a step of recovering the clarified fraction of the contents of the chamber, said recovery step and supply step taking place simultaneously, so as to keep the level of the contents of the chamber substantially constant during the recovery step and supply step, said method comprising:
- a step of controlling the recovery means, during which:
  - the recovery duct is filled with air until the recovery duct has been completely emptied of the clarified fraction contained in the recovery duct, and
  - the recovery duct is kept filled with air during the reaction sequence and until the end of the decanting step,
- a step of expelling the air contained in the recovery duct with the clarified fraction just before the supply step and the recovery step,
- after the step of supplying the SBR, a step of filling the recovery duct with air by air injection, the exhaust valve being closed and the air/water blocking device being referred to as closed, during the aeration step,
- a step of keeping the recovery duct filled with air without air injection, the exhaust valve being closed and the air/water blocking device being referred to as closed, during the aeration step and decanting step.

2. The treatment method as claimed in claim 1, wherein, during the step of filling the recovery duct with air, the exhaust valve is in the closed position, and the air/water blocking device blocks the air in the recovery duct by creating a hydraulic discontinuity between upstream and downstream of the air/water blocking device.

3. The treatment method as claimed in claim 1, wherein, during the step of expelling the air from the recovery duct, the exhaust valve is in the open position so as to allow the evacuation of the air simultaneously with the ingress of clarified water into the recovery duct.

4. The treatment method as claimed in claim 3, wherein, during the step of expelling the air from the recovery duct, after the evacuation of the air, the air/water blocking device takes up the position referred to as open so as to allow the clarified fraction to leave through the recovery orifices.

5. An installation for treating a wastewater effluent in a sequencing batch reactor (SBR), said SBR comprising:

- a chamber that is able to contain a mixture of wastewater and sludge comprising different levels, each level being defined by a concentration and/or a density of sludge,
- a sludge bed situated at the bottom of the chamber,
- a device for supplying the SBR with a volume of effluent to be treated close to the bottom of the chamber, in the sludge bed,
- means for recovering a clarified fraction of the contents of the chamber, comprising:
  - a recovery duct extending below the surface of the contents of the chamber, between the interior and the exterior of the chamber, comprising:
    - a plurality of channels hydraulically connecting the contents of the chamber and the recovery duct,
    - a plurality of recovery orifices via which the clarified fraction of the contents of the chamber is intended to be drained,
    - an air duct hydraulically or aeraulically connecting the recovery duct to the atmosphere,
  - an air exhaust valve on the air duct, which is able to take up an open position or a closed position,
  - an air/water blocking device on the recovery duct, the exhaust valve being able to block the air in the recovery duct or to allow it to pass through,
  - an air injector connected to the recovery duct and intended to supply the recovery duct with boosted and/or compressed air, the SBR being able to implement a treatment method comprising a biological treatment reaction sequence comprising at least a step of aerating the contents of the chamber, during which the level of the surface of the mixture rises, a decanting step, during which sludge is deposited on the bottom of the chamber and the contents of the chamber are clarified close to the surface thereof, a step of recovering the clarified fraction of the contents of the chamber, said recovery step and supply step taking place simultaneously, so as to keep the level of the contents of the chamber substantially constant during the recovery step and supply step,

- the installation also comprising means for controlling the recovery means so as to fill the recovery duct with air until the recovery duct has been completely emptied of the clarified fraction contained in the recovery duct, to keep the recovery duct filled with air during the aeration step, and to expel the air contained in the recovery duct with the clarified fraction just before the supply step and the recovery step, to fill the recovery duct with air by air injection during the aeration step, to keep the recovery duct filled with air without air injection during the aeration step and until the end of the decanting step.

6. The treatment installation as claimed in claim 5, wherein the blocking device comprises a U-shaped siphon between the air duct and the recovery orifices.

7. The treatment installation as claimed in claim 5, wherein the recovery orifices are positioned above the level of the recovery duct, and the recovery duct comprises an air exhaust duct.

8. The treatment installation as claimed in claim 5, wherein the recovery orifices are positioned below the level of the recovery duct, and the recovery duct comprises an air exhaust duct.

9. The treatment installation as claimed in claim 5, wherein the blocking device comprises a control valve positioned at the recovery orifices.

10. The treatment method as claimed in claim 1, wherein during the step of supplying the SBR, the volume of effluent to be treated is introduced in the sludge bed via a distribution network covering the bottom of the chamber.

11. The treatment installation as claimed in claim 5, wherein the device for supplying the SBR with a volume of effluent to be treated in the sludge bed supplies the volume of effluent to be treated via a distribution network covering the bottom of the chamber.

12. A method for treating a wastewater effluent in a sequencing batch reactor (SBR), said SBR comprising:

- a chamber that is able to contain a mixture of wastewater and sludge comprising different levels, each level being defined by a concentration and/or a density of sludge,
- a sludge bed situated at the bottom of the chamber,
- means for recovering a clarified fraction of the contents of the chamber, comprising:
  - a recovery duct extending below the surface of the mixture in the chamber, between the interior and the exterior of the chamber, comprising:
    - a plurality of channels hydraulically connecting the contents of the chamber and the recovery duct,
    - a plurality of recovery orifices via which the clarified fraction of the contents of the chamber is intended to be drained, the plurality of recovery orifices being positioned above the level of the recovery duct,
    - an air duct hydraulically or aeraulically connecting the recovery duct to the atmosphere,
  - an air exhaust valve on the air duct, which is able to take up an open position or a closed position,
  - an air/water blocking device on the recovery duct, which is able to pass from a state referred to as closed to a state referred to as open, and vice versa, so as to block the air in the recovery duct upstream of the air/water blocking device and to block the water downstream of the blocking device,
  - an air injector connected to the recovery duct and intended to supply the recovery duct with boosted and/or compressed air,
- said method comprising:
- a step of supplying the SBR, during which a volume of effluent to be treated close to the bottom of the chamber is introduced, in the sludge bed,
- a biological treatment reaction sequence comprising at least:
  - a step of aerating the contents of the chamber, during which the level of the surface of the mixture rises,
- a decanting step, during which sludge is deposited on the bottom of the chamber and the contents of the chamber are clarified close to the surface thereof, a step of recovering the clarified fraction of the contents of the chamber, said recovery step and supply step taking place simultaneously, so as to keep the level of the contents of the chamber substantially constant during the recovery step and supply step, said method comprising:

a step of controlling the recovery means, during which:

the recovery duct is filled with air until the recovery duct has been completely emptied of the clarified fraction contained in the recovery duct, and the recovery duct is kept filled with air during the reaction sequence and until the end of the decanting step, a step of expelling the air contained in the recovery duct with the clarified fraction just before the supply step and the recovery step, after the step of supplying the SBR, a step of filling the recovery duct with air by air injection, the exhaust valve being closed and the air/water blocking device being referred to as closed, during the aeration step, a step of keeping the recovery duct filled with air without air injection, the exhaust valve being closed and the air/water blocking device being referred to as closed, during the aeration step and decanting step.

* * * * *